United States Patent
Shibata

[11] Patent Number: 6,158,079
[45] Date of Patent: Dec. 12, 2000

[54] WIPER ARM

[75] Inventor: Toshiyuki Shibata, Hamana-gun, Japan

[73] Assignee: ASMO Co., Ltd., Shizuoka-pref., Japan

[21] Appl. No.: 09/207,063

[22] Filed: Dec. 7, 1998

[30] Foreign Application Priority Data

Dec. 22, 1997 [JP] Japan .................................. 9-352976

[51] Int. Cl.$^7$ .................................................. B60S 1/32
[52] U.S. Cl. ................................ 15/250.351; 15/250.201
[58] Field of Search ....................... 15/250.351, 250.352, 15/250.34, 250.21, 250.201

[56] References Cited

FOREIGN PATENT DOCUMENTS

| 320220 | 6/1989 | European Pat. Off. | .......... 15/250.351 |
|--------|--------|--------|--------|
| 2636902 | 3/1990 | France | ................. 15/250.352 |
| 2622286 | 11/1977 | Germany | ............. 15/250.351 |
| 3837193 | 5/1990 | Germany | ............. 15/250.352 |
| 2-71057 U | 5/1990 | Japan . | |

*Primary Examiner*—Gary K. Graham
*Attorney, Agent, or Firm*—Fish & Richardson P.C.

[57] ABSTRACT

A wiper arm for driving a wiper blade to wipe a windshield of a vehicle. The wiper arm is composed of an arm head, a retainer, an arm piece and a coil spring for urging the wiper blade against the windshield. The retainer has an inclining front surface to prevent dynamic lift by air flow, and a coil spring is disposed to align with a common longitudinal center line of the retainer and the arm head to prevent an angular moment.

9 Claims, 4 Drawing Sheets

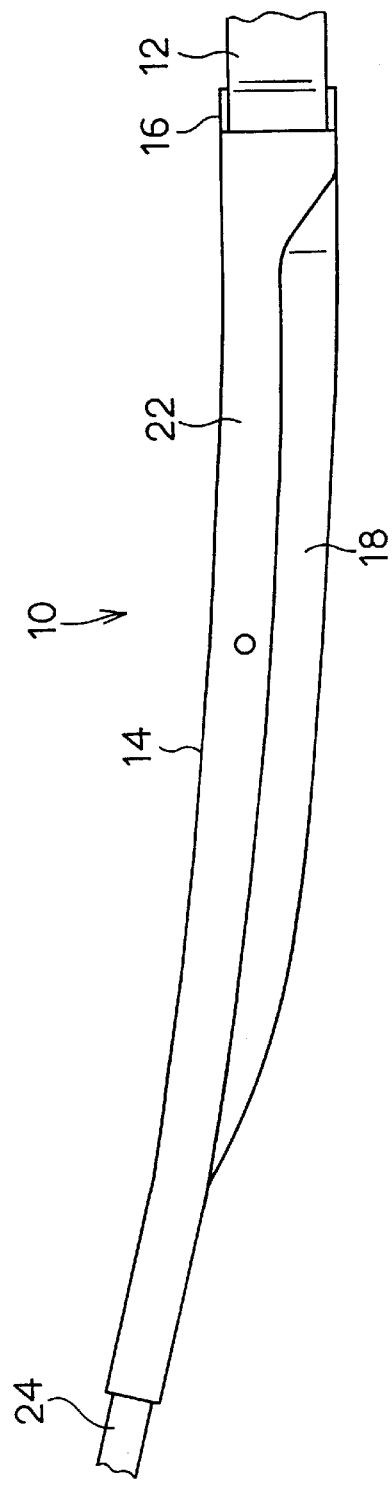
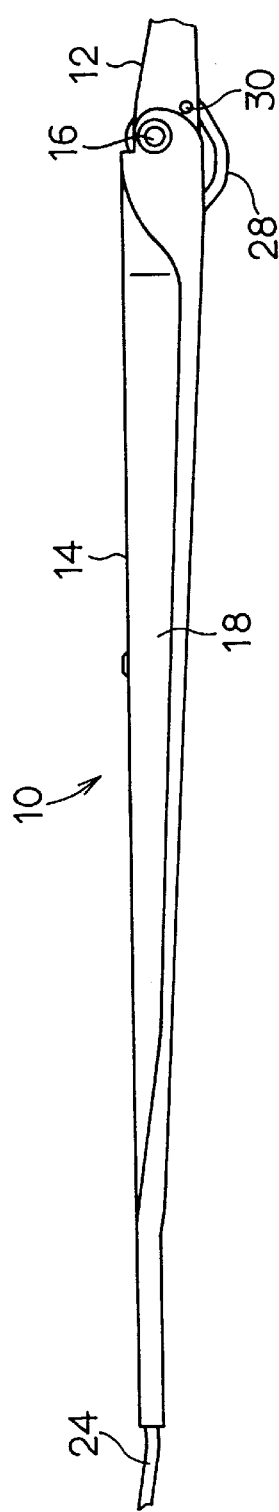

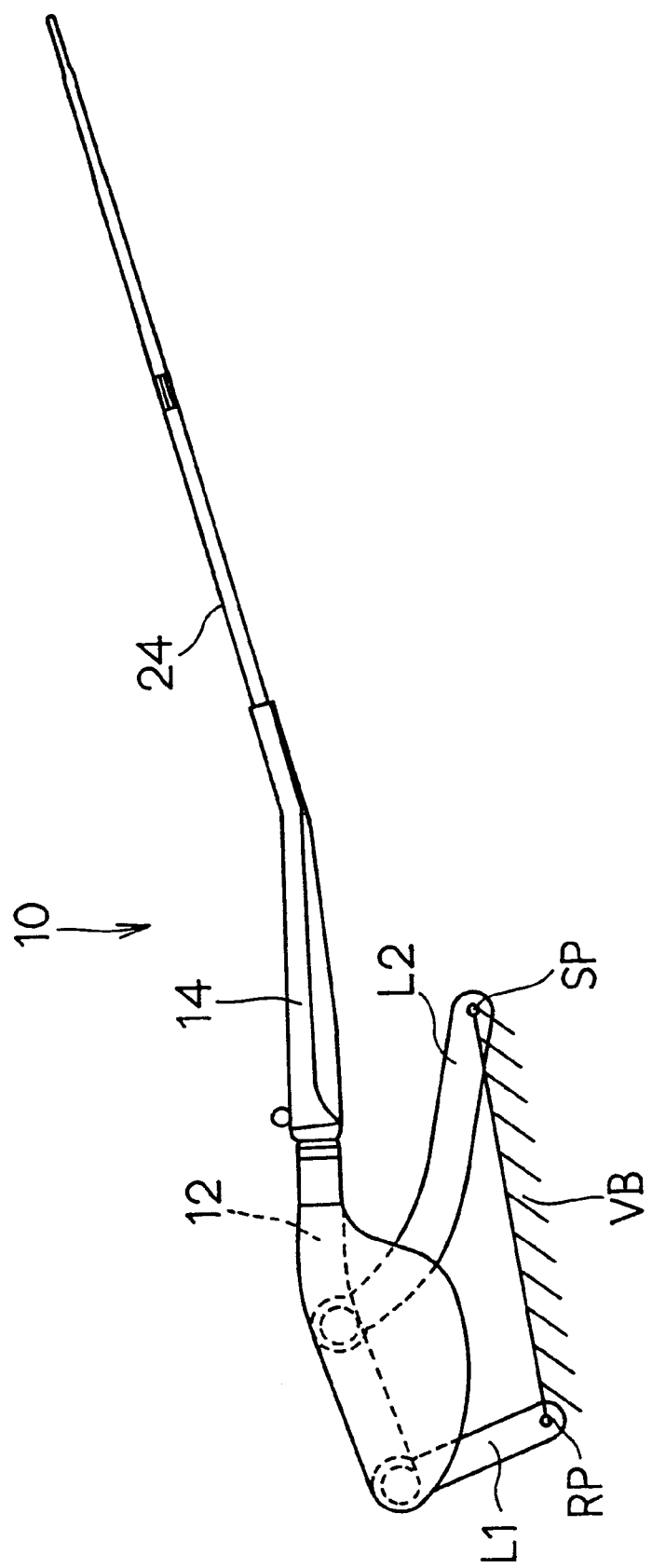

WIPER ARM

CROSS REFERENCE TO RELATED APPLICATION

The present application is based on and claims priority from Japanese Patent Application Hei 9-352976, filed on Dec. 22, 1997, the contents of which are incorporated herein by reference.

BACKGROUND OF THE INVENTION

1. Field of the Invention

The present invention relates to a wiper arm of a vehicle windshield wiper.

2. Description of the Related Art

A wiper arm has an arm head fixed to a pivot mounted on a portion of a vehicle body at one end and a retainer at the other end thereof. The retainer is rotatably connected to the arm head to move close to or apart from the surface of windshield in a suitable angle. The retainer retains an arm piece at the tip thereof, and the arm piece holds a wiper blade. A coil spring is disposed between the arm head and the retainer to press the retainer toward the windshield. An end of the coil spring is fixed to the base portion of the arm piece. The wiper blade is composed of a rubber blade and a holder lever.

When the wiper operates, the wiper arm and wiper blade swing back and forth on the windshield to wipe off raindrops.

The retainer usually has a top wall and a pair of parallel walls extending from opposite sides of the top wall. Therefore, the retainer has a U-shaped cross section, and the open side of the retainer faces the windshield.

When the vehicle runs at a high speed and the retainer is put in high speed air flow, not only a big air-blowing sound but also dynamic lift are generated.

In order to prevent such problems, it has been proposed that the front side of the wall that is located at the upstream side of the retainer is inclined. However, in the wiper arm having such inclined front wall, the coil spring disposed between the front and rear walls become so close to the front wall that the coil member may interfere with the front wall. This causes another noise, and the spring may scratch coating of the retainer, thereby causing the retainer to rust.

Moreover, because the arm piece has to be fixed to the side of the top wall near the rear wall, an angular moment or torsion is generated relative to the longitudinal center line of the retainer by the spring, thereby resulting noises and unstable wiping.

SUMMARY OF THE INVENTION

The present invention has an object of providing a simple wiper arm which is free from the above problems.

According to a main aspect of the invention, a wiper arm for wiping a windshield of a vehicle is composed of an arm head, a retainer having an inclining front wall for preventing dynamic lift by air flow, an arm piece for holding the wiper blade and a spring for urging the arm piece toward the windshield. In particular, the arm head and the retainer has a common longitudinal center line, and the spring is disposed to align with the common longitudinal center line.

In the above stated wiper arm, the arm piece has a bent portion extending across the common longitudinal center line to hold one end of the spring on the longitudinal center line.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 2 is a plan view illustrating a main portion of the wiper arm according to the preferred embodiment;

FIG. 3 is a front view illustrating a main portion of the wiper arm according to the preferred embodiment;

FIG. 6 is a schematic diagram of a four-joint-type wiper device using the wiper arm according to the preferred embodiment.

DETAILED DESCRIPTION OF A PREFERRED EMBODIMENT

A wiper arm according to a preferred embodiment of the invention is described with reference to FIGS. 1–6.

Figure 5:
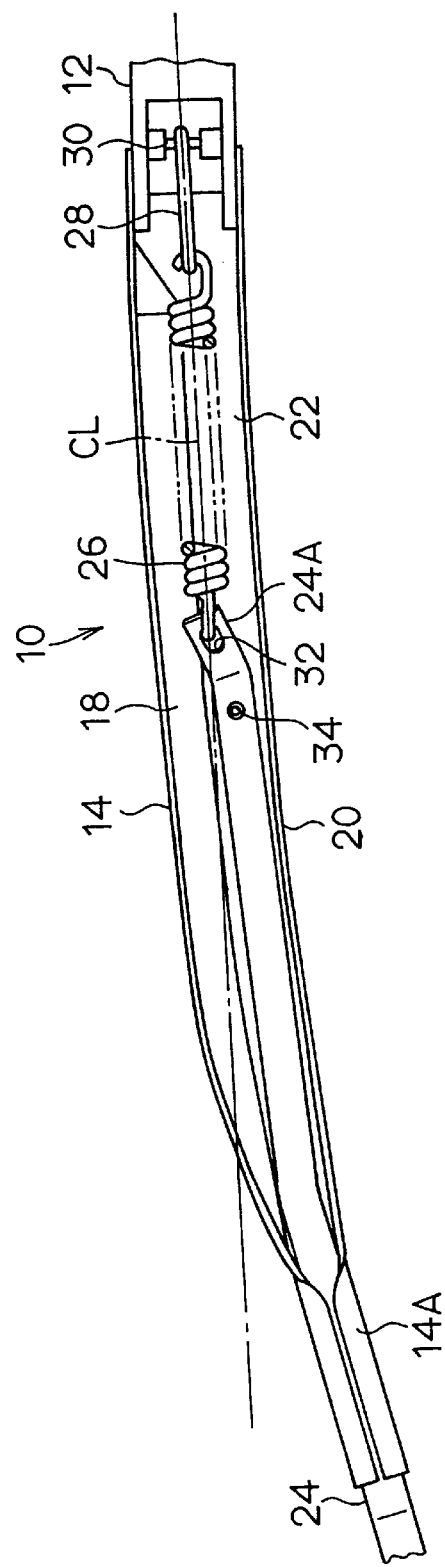
FIG. 5 is a bottom view of the wiper arm illustrated in FIG. 3.

Wiper arm 10 has arm head 12. Arm head 12 is fixed to a rotating pivot RP and a support pin SP extending from portions of vehicle body VB via a pair of levers L1, L2 as shown in in FIG. 6. Arm head 12 has a fork portion having a pair of parallel wall members at the other end as shown in FIG. 5. Rotary shaft 16 is supported by the parallel wall members to connect arm head 12 and retainer 14 so that retainer 14 can move close to or apart from a windshield in a suitable distance. A pin 30 is also supported by the parallel walls to hold hook member 28 on common center line (or a longitudinal line that is perpendicular to rotation axis of retainer 14 relative to arm head 12) CL of arm head 12 and retainer 14.

Figure 1:
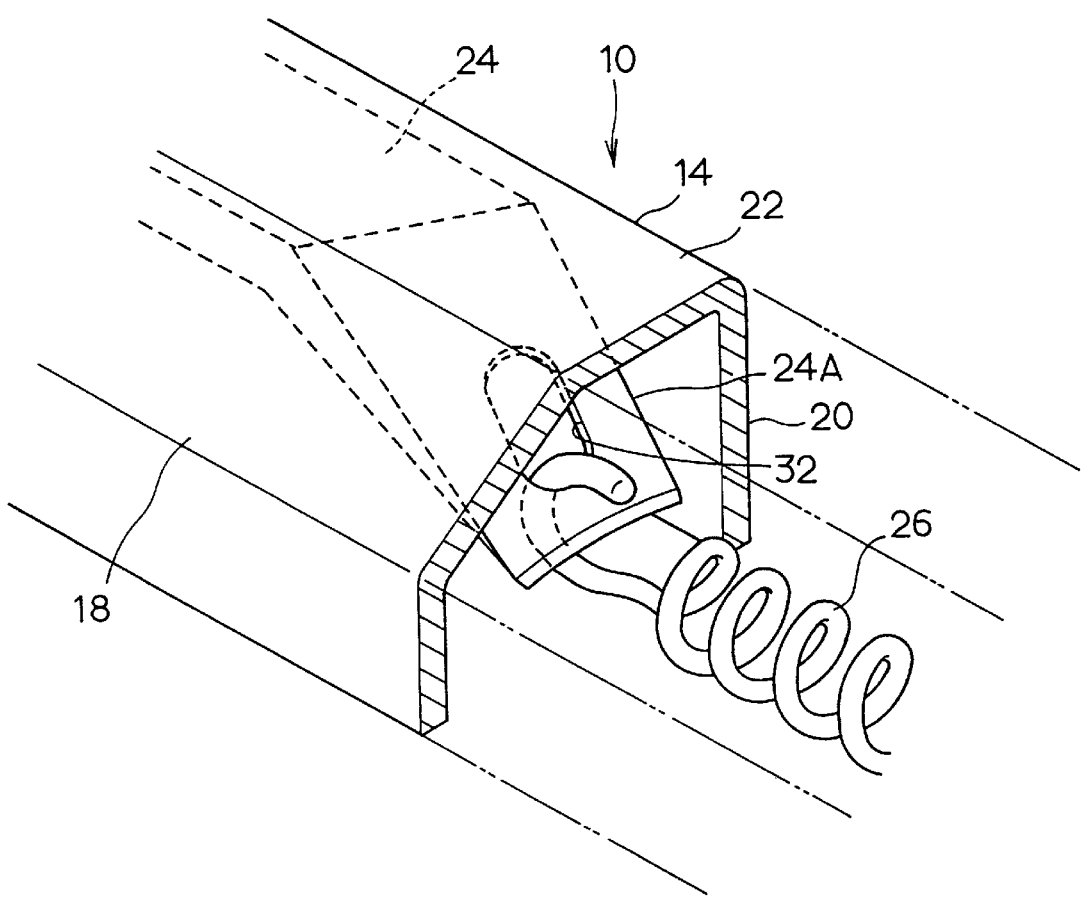
FIG. 1 is a fragmentary perspective view illustrating a base portion of an arm piece and a spring of a wiper arm according to a preferred embodiment of the invention.
Figure 4:
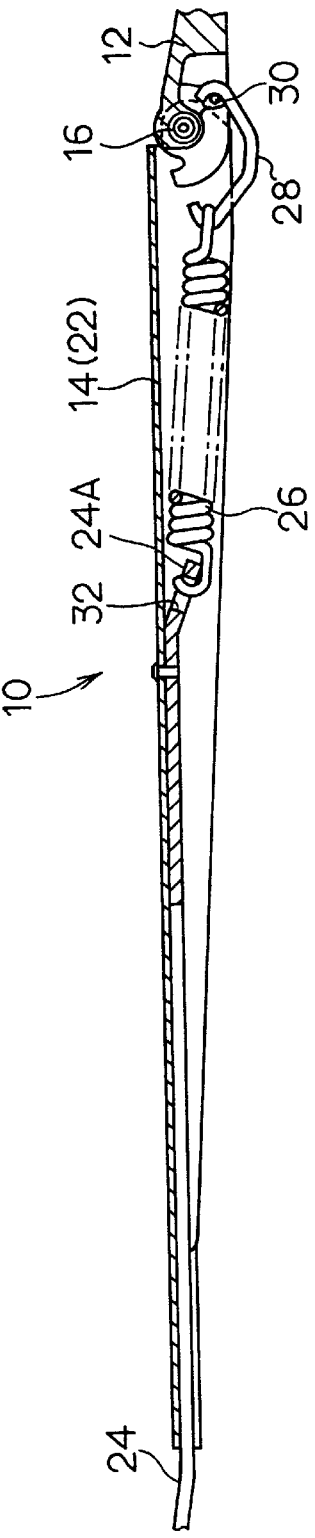
FIG. 4 is a cross-sectional front view of the wiper arm illustrated in FIG. 3.

Retainer 14 has front wall 18, rear wall 20 at a base portion thereof and top wall 22 formed between front and rear walls 18, 20. The opening side of retainer 14 faces the windshield glass. Thus, retainer 14 has a U-shaped cross section at the base portion. Front wall 18 inclines so that the side edge thereof separates from rear wall 20 as shown in FIGS. 1 and 2. Front wall 18 is to be located at the upstream side of retainer in the air flow flowing along the windshield glass when the vehicle runs. Retainer 14 also has grip portion 14A at the tip thereof.

Arm piece 24 is held by grip portion 14A of retainer 14 and extends in the space inside the base portion of retainer 14 along top wall 22 and is fixed to top wall 22 by rivet 34. Arm piece 24 has bent support 24A at one end thereof. Support 24A has engagement hole 32 and inclines to extend across center line CL so that engagement hole 32 can be located near center line CL that is spaced apart from front, rear and top walls 18, 20 and 22 as shown in FIG. 1. Arm piece 24 also extends outward from grip portion 14A and has a U-bent holder (not shown) for holding a wiper blade via a clip (not shown) at the tip thereof.

Spring 26 is fixed to hook member 28 at one end and to engagement hole 32 at the other end so that spring 26 can be aligned with center line CL. Thus, spring 26 can be spaced apart from top, front and rear walls 22, 18, 20 respectively, thereby preventing interference with any one of walls 18, 20, 22. Because spring 26 is aligned with common center line CL of arm head 12 and retainer 14, no angular moment is exerted on wiper arm 10.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A wiper arm for driving a wiper blade to wipe a windshield of a vehicle comprising:

an arm head connectable to an outside driving member;

a retainer having a base portion rotatably connected to said arm head by a shaft, said base portion having a top wall, a rear wall having a side edge adjacent the top wall, and a front wall having a first side edge adjacent the top wall and a second side edge spaced apart from the top wall, said front wall having an inclining surface extending toward said windshield such that the second side edge is further from the rear wall than said first side edge;

an arm piece fixed to said retainer along said top wall for holding said wiper blade at one end; and a spring disposed between said arm head and said retainer to urge said retainer toward said windshield, wherein said arm head and said base portion of said retainer have a common longitudinal center line spaced apart from said top wall, said front wall and said rear wall, said retainer comprises a member for positioning one end of said spring on said common longitudinal center line, and the other end of said arm piece comprises a bent support extending apart from said rear wall and said top wall across said common longitudinal center line to fix the other end of said spring on said longitudinal center line, thereby aligning said spring with said common longitudinal center line.

2. The wiper arm as claimed in claim 1, wherein said spring member comprises a coil spring.

3. The wiper arm as claimed in claim 1, wherein said tip portion of said retainer comprises a grip member for holding said arm piece.

4. The wiper arm as claimed in claim 3, wherein said arm piece is further fixed to said retainer by a rivet.

5. The wiper arm as claimed in claim 1, wherein said common longitudinal center line is perpendicular to said shaft.

6. The wiper arm as claimed in claim 1, wherein said arm piece is fixed to said top wall to be spaced apart from said front wall.

7. The wiper arm as claimed in claim 1, wherein said top wall is formed between said inclined surface and said rear wall.

8. The wiper arm as claimed in claim 1, wherein said arm piece has a portion disposed in said retainer, said arm piece portion being disposed apart from said front wall.

9. The wiper arm as claimed in claim 1, wherein said member comprises a hook member having one end connected to said spring and the other end supported by said arm head.

\* \* \* \* \*